United States Patent [19]

Lewis

[11] Patent Number: 4,548,975

[45] Date of Patent: Oct. 22, 1985

[54] DISCOLORATION-RESISTANT SPANDEX FIBER

[75] Inventor: William Lewis, Waynesboro, Va.

[73] Assignee: E. I. Du Pont de Nemours and Company, Wilmington, Del.

[21] Appl. No.: 535,688

[22] Filed: Sep. 26, 1983

[51] Int. Cl.[4] ............................................. D02G 3/00
[52] U.S. Cl. .................................... 524/147; 524/101; 428/364
[58] Field of Search ................. 428/364; 524/147, 101

[56] References Cited

U.S. PATENT DOCUMENTS

| | | | |
|---|---|---|---|
| 3,373,251 | 3/1968 | Megna et al. | 524/120 |
| 3,419,524 | 12/1968 | Larrison | 524/128 |
| 4,228,247 | 10/1980 | Moore et al. | 260/457 |

Primary Examiner—Marion E. McCamish
Assistant Examiner—Beverly K. Johnson

[57] ABSTRACT

Increased resistance to discoloration induced by smog or heat is imparted to a spandex fiber by incorporating within the fiber a phenolic antioxidant and a dialkyl phenyl phosphite in which at least half of the alkyl groups are branched at the alpha position and the phenyl groups are unsubstituted or monoalkyl substituted.

13 Claims, No Drawings

DISCOLORATION-RESISTANT SPANDEX FIBER

BACKGROUND OF THE INVENTION

1. Field of the Invention

This invention is related to a spandex fiber which is protected by a combination of phenolic and phosphitic antioxidants against discoloration due to heat and/or atmospheric smog. In particular the invention concerns such spandex fiber which has improved resistance to heat and smog provided by an antioxidant combination that includes a particularly effective type of phosphitic antioxidant.

2. Description of the Prior Art

Spandex fibers are well known in the art. Such fibers, especially polyether-based spandex fibers are known to discolor upon heating and/or upon prolonged exposure to atmospheric smog. Many agents have been suggested in the art to combat these discoloration problems. These include combinations of phenolic and phosphitic additives, such as those disclosed in Bell et al., U.S. Pat. No. 3,386,942 and Megna et al., U.S. Pat. No. 3,573,251. Although many such combinations of agents have been suggested, few, if any, have been utilized commercially with spandex fibers. Further improvements in the resistance of spandex fibers to discoloration are still desired to enhance the utility of the fibers in many end uses.

In seeking a solution to the above-described problem, the present inventor found that when conventional hindered phenolic antioxidants are used in spandex fibers with a particular type of phosphitic antioxidants, selected from the many known types of phosphitic antioxidants, the resistance of the fibers to discoloration is surprisingly much greater than when the fibers contain the additive combinations disclosed in the art.

SUMMARY OF THE INVENTION

The present invention provides an improved spandex fiber of the type which is protected by an additive combination that includes a phenol and a phosphite. Use of the present invention increases the resistance of the fiber to heat-induced and/or smog-induced discoloration. The improvement of the present invention comprises spandex fibers which contain an effective amount of a dialkyl phenyl phosphite in which at least half of the alkyls are branched at the alpha-position and the phenyls are unsubstituted or monoalkyl-substituted. Phosphite concentrations as low as about one-half percent by weight of the fiber or as high as ten percent, in combination with a phenolic antioxidant, can be effective, but the preferred phosphite concentration is usually in the range of 1 to 5%, and most preferably 1 to 3%. The preferred phosphite additive is a decaphenyl heptakis(dipropylene glycol) octaphosphite. Preferred hindered phenols with which the phosphite is used in combination include 2,4,6-tris(4-t-butyl-2,6-dimethyl-3-hydroxybenzyl)isocyanurate and the condensation product of p-cresol, dicyclopentadiene and isobutene.

DETAILED DESCRIPTION OF PREFERRED EMBODIMENTS

As used herein, the term fiber includes staple fibers and/or continuous filaments.

In accordance with the present invention, the effective amount of the dialkyl phenyl phosphite stabilizer can vary over a fairly broad range. Improvements in the resistance of the spandex fiber to discoloration are obtained when a concentration of the dialkyl phenyl phosphite stabilizer as low as one-half percent by weight of the fiber is used in combination with a conventional phenolic antioxidant in the fiber. However, larger improvements are obtained when the dialkyl phenyl phosphite concentration is at least 1%. Although large concentrations of the phosphitic antioxidant can sometimes be used (e.g., 10%), a concentration of less than 5% is usually used and the preferred concentration is in the range of 1 to 3%.

Numerous phenolic antioxidants are known in the art for use in spandex fibers. Such antioxidants are also suitable for use in the spandex fibers of the present invention. Among suitable antioxidants are the hindered phenols given in the examples of the present application. Usually the phenolic antioxidant is in a concentration of as little as one-half percent or as much as five percent by weight of the fiber. However, for use in the present invention, the preferred concentration by weight is usually about half of that of the phosphitic antioxidant (i.e., 40-60% by weight of the phosphitic additive). Two particularly useful hindered phenols, each of which provides a preferred combination with a dialkyl phenyl phosphite additive of the present invention are 2,4,6-tris(4-t-butyl-2,6-dimethyl-3-hydroxybenzyl)isocyanurate and the condensation product of p-cresol, dicyclopentadiene, and isobutene.

The major effect of using phosphites in accordance with the present invention is that the resistance of the spandex fibers to smog-induced discoloration is improved significantly. Resistance to thermally induced or other discoloration is not improved as much. Therefore, when choosing the phenolic antioxidant for use in accordance with the invention, one should select a phenolic additive that, even without the phosphite, gives good thermal performance rather than a penolic that gives a poorer thermal performance. On the other hand, it is of little consequence if the phenolic antioxidant (without the phosphite) gives poor resistance to smog because the phosphite more than compensates for this lack in the phenol. Thus, phosphites used in accordance with the present invention, permit the substitution of an inexpensive phenol which usually imparts less smog resistance for a more expensive phenol without significantly sacrificing overall performance of the spandex fiber.

The dialkyl phenyl phosphites for use in the present invention include both monomeric and polymeric forms. By traditional definition, the phosphites have two alkyl groups and one phenyl group per phosphorus moiety in the additive. However, in the present invention some latitude is permitted in the number of alkyl groups and phenyl groups per phosphorus moiety. In the monomeric phosphites of the invention the two alkyl groups and one phenyl group per phosphorus moiety is fairly readily maintained. However, in the polymeric phosphites of the invention the number of alkyl groups per phosphorus moiety may average in the range of 1.7:1 to 2.2:1 and the phenyl groups per phosphite moiety may average in the range of 0.8:1 to 1.3:1.

The polymeric dialkyl phenyl phosphites of the present invention, on the average, preferably contain no more than eight phosphorus atoms per molecule in order to avoid gelation of the phosphite during manufacture. To avoid volatilization or extraction of the phosphite additive from the fiber, the additive is usually prepared with a molecular weight of greater than 350 and preferably greater than about 400. Usually molecular weights of no higher than about 4000 are employed. To be effective in increasing the discoloration resistance of the spandex fibers, especially the polyether-based spandex fibers, the dialkyl phenyl phosphite additive used in the present invention must be such that at least half of the alkyl groups are branched at the alpha-position and the phenyl groups are not substituted or are monoalkyl substituted.

In the dialkyl phenyl phosphites of use in the invention, the alkyl groups may be present as a link in the molecular chain, as a terminal group or as a pendant group. In the following structural formula, which illustrates monomeric phosphites of use in the invention, X, Y and Z are alkyl groups. Note, however, that the discussion below applies also to the alkyl groups, or their residues, in the polymeric phosphites of the invention as well.

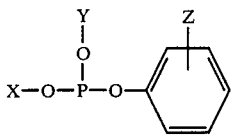

The alkyl groups, X, Y and Z, may be the same or different. Generally, the alkyl groups, when not substituted, contain 6 to 22 carbon atoms, with 8 to 18 being preferred. However, when the alkyl group is substituted, the alkyl group need contain only one carbon atom, but at least 3 carbon atoms are preferred.

The alkyl groups may be linear, branched, cyclic or a cycloaliphatic. Some substituted alkyls are also suitable for use in the invention. As used herein substituted alkyl means an alkyl group that has connected to it a functional group which (a) does not interfere with the effectiveness of the phosphite additive, (b) does not detrimentally affect the color or other properties of the spandex fiber and (c) does not adversely affect any other additives which may be present. Examples of such substituents may include ester, ether, thioether, halogen, phenyl or other groups. However, especially for monomeric phosphites, unsubstituted alkyl groups are preferred because of their ease of manufacture. A preferred monomeric phosphite for use in the invention is phenyl di-2-decyl phosphite. A preferred polyphosphite for use in the invention is decaphenyl heptakis(dipropylene glycol) octaphosphite.

To prepare the phosphite additives for use in the present invention, the starting material is usually triphenyl phosphite or phosphorus trichloride. A convenient way to make the monophosphite is to react triphenyl phosphite with an aliphatic alcohol or mixture of such alcohols in the presence of a catalyst. Similarly, to make the diphosphite or polyphosphites, triphenyl phosphite is reacted with an appropriate glycol or mixture of glycols. Because dipropylene glycol is inexpensive and readily available, it is a preferred starting glycol for the polyphosphites of the invention. Known procedures, similar to those disclosed in U.S. Pat. No. 3,419,524, are suitable for preparing the phosphites suitable for use in the present invention.

In making spandex fibers according to the present invention, a solution of a long chain synthetic polymer comprising at least 85% segmented polyurethane is prepared and then dry spun through orifices into filaments. An effective amount of the dialkyl phenyl phosphite additive, along with a phenolic antioxidant and other desired additives are usually dissolved or dispersed in the solvent and then added to the polymer solution at any of several points in the solution-handling system upstream of the orifices.

As indicated above, the improved spandex fibers of the present invention are made from segmented polyurethane polymers, such as those based on polyethers, polyesters, polyetheresters and the like. Such fibers are prepared by well-known methods, such as those described in U.S. Pat. Nos. 2,929,804, 3,097,192, 3,428,711, 3,553,290 and 3,555,115. Some of these spandex polymers are more susceptible than others to discoloration by heat and/or smog. With regard to the present invention, spandex fibers made from polyether-based polyurethanes benefit more than others from the inclusion of the additive in accordance with the invention. For this reason, embodiments of the invention that include polyether-based polyurethanes are preferred.

In addition to the phenolic antioxidants and the particular phosphites mentioned above, the spandex fibers of the invention may also contain a variety of additives for different purposes, such as delustrants, additional antioxidants, dyes, dye enhancers, U.V. stabilizers, pigments, etc. so long as such additives do not produce antagonistic effects with the phosphites. Also, when finishing or dyeing yarns or fabrics made from fibers of the invention, care must be exercised to avoid deactivating or extracting the additive.

The following test procedures are used for measuring the various parameters discussed above.

Discoloration of test samples is determined as a change in "b" value, which is measured by means of a differential colorimeter (e.g., a model D-25-3 Differential Colorimeter manufactured by Hunter Associates Laboratory, Inc., Reston, Virginia) which has been calibrated against the manufacturer's standard reference plates. For these measurements, when the test sample is a yarn, the yarn is wound under low tension on an aluminum plate measuring 3 inches by 4 inches by 1/16 inch (7.6×10.7×0.16 cm) to form a layer of about $\frac{1}{8}$-inch (0.32-cm) thickness. When the sample is a fabric, four layers of the fabric are placed on a glass plate.

The test for smog discoloration is carried out by exposing yarn samples wound on aluminum plates, as described in the preceding paragraph, in a 200-liter laboratory test chamber, to a synthetic gaseous mixture made up of about seven parts per million (ppm) nitrogen dioxide, seven ppm sulfur dioxide, and forty-six ppm 2-pentene in air at a total flow of 5800 milliliters per minute, while irradiating the samples with eight "daylight" and four "black" fluorescent tubes (e.g., type F30T8 and F30T8BL manufactured by General Electric Co.). This exposure has been found to correlate with end-use performance in smoggy atmospheres, such as those encountered in the city of Los Angeles, California. For the results reported herein, the samples were exposed for eight to thirty-two hours in a Scott Controlled Atmospheric Tester (SCAT). The SCAT unit is described in greater detail in Technical Information Bulletin L-33 (issued by the Textile Fibers Department Technical Service Section of E. I. du Pont de Nemours & Company, Inc., Wilmington, Delaware). Before exposure in the SCAT chamber, the samples are heated at 92°–95° C. for 30 min. in tap water containing sufficient phosphoric acid to adjust the pH to 5.0±0.1. This treatment simulates the hot, wet finishing treatment that fabrics containing spandex yarns receive in the trade.

The samples are then rinsed and dried for about 16 hours in a ventilated hood.

The thermal exposure test reported herein is carried out by hanging samples (prepared as described above) in a forced-draft air oven at 150° C. for four hours or at 200° C. for two ten-minute periods. The thermal exposure at 200° C. simulates the heat setting that is conventionally performed in the trade on nylon/spandex fabrics. The relatively long exposures in the 200° C.-thermal tests are needed to allow the mass of yarn wound on the sample plates to come to temperature.

For each SCAT- and thermal-exposure test, "b" values of the sample are measured before and after exposure. The difference in "b" values before and after exposure is reported as "Δb" in the examples below. Because of variability in the exposure conditions of the SCAT- and thermal-exposure tests, a control sample is always exposed simultaneously with the test samples to provide a convenient way to compare the results from one test batch to another.

The invention is illustrated further, but is not intended to be limited by the following examples in which all percentages, unless otherwise specified, are by total weight of the fibers (without finish). Each Example demonstrates the surprisingly large improvement in discoloration resistance that is imparted to spandex fibers by incorporating into the spandex fiber effective amounts of dialkyl phenyl phosphites in accordance with the invention. Examples I-V show the improvement in polyether-based spandex fibers. Example VI shows the improvement in a polyester-based spandex fiber. Examples III and IV particularly demonstrate the unexpected superiority of the particular dialkyl phenyl phosphites required by the present invention over other known phosphite stabilizers. Example V shows a dialkyl phenyl phosphite in accordance with the present invention being combined with a large number of different types of known phenolic antioxidants to provide a large improvement in the resistance of the spandex fiber to discoloration.

The various additives used in the Examples, their abbreviated designations and their chemical composition are summarized in Table I which concerns phosphorus-containing additives, Table II which concerns phenolic antioxidants and Table III which concerns other additives.

TABLE I

| Phosphorus-Containing Additives Used in Examples | |
|---|---|
| Designation | Description* |
| A. Of the Invention | |
| Weston ® DHOP | decaphenyl heptakis(dipropylene glycol) octaphosphite |
| Mark ® 5064 | decaphenyl heptakis(dipropylene glycol) octaphosphite |
| NP-DHOP | decakis(nonylphenyl) heptakis-(dipropylene glycol) octaphosphite |
| DPDD(HBA)DP | diphenyl diisodecyl (hydrogenated bisphenol A) diphosphite |
| — | tetra-2-octyl (bisphenol A) diphosphite |
| — | diphenyl di-2-octyl (1,12-dodecanediol) diphosphite |
| — | phenyl 2-octyl 1-octadecyl phosphite |
| — | phenyl di-2-decyl phosphite |
| B. Comparisons | |
| Weston ® THOP | tetraphenyl dipropylene glycol diphosphite |
| Weston ® TNPP | tris(nonylphenyl) phosphite |
| Weston ® 618 | distearyl pentaerythritol diphosphite |
| Weston ® 494 | diisooctyl octaphenyl phosphite |
| Weston ® PDDP | phenyl diisodecyl phosphite |
| Weston ® DPDP | diphenyl isodecyl phosphite |
| Weston ® PTP | heptakis(dipropylene glycol) triphosphite |
| Mark ® 2112 | tris(2,4-di-t-butylphenyl) phosphite |
| Sandostab ® P-EPQ | tetrakis(2,4-di-t-butylphenyl) 4,4'-biphenylenediphosphonite |
| Ultranox ® 626 | bis(2,4-di-t-butylphenyl) pentaerythritol diphosphite |
| TBP | tribenzyl phosphite |
| TLP | trilauryl phosphite |
| TPP | triphenyl phosphite |
| NP-THOP | tetrakis(nonylphenyl) dipropylene glycol diphosphite |

*Weston ® and Ultranox ® additives are manufactured by Borg-Warner Chemicals Co., Parkersburg, West Virginia; Mark ® additives are manufactured by Argus Chemical Division, Witco Chemical Corp., Brooklyn, New York; and Sandostab ® additive is manufactured by Sandoz Chemicals & Colors, East Hanover, New Jersey.

TABLE II

| Phenolic Additives Used in Examples | |
|---|---|
| Designation | Description* |
| Cyanox ® 1790 | 2,4,6-tris(2,6-dimethyl-4-t-butyl-3-hydroxybenzyl)isocyanurate |
| Wingstay ® L | condensation product of p-cresol, dicyclopentadiene and isobutene |
| Irganox ® 245 | triethylene glycol-bis-3-(3-t-butyl-4-hydroxy-5-methylphenyl)propionate |
| Irganox ® 565 | 4-((4,6-bis(octylthio)-s-triazin-2-yl)amino)-2,6-di-t-butylphenol |
| Irganox ® 1010 | tetrakis(methylene-3-(3',5'-di-t-butyl-4'-hydroxyphenyl)propionate)-methane |
| Irganox ® 1024 | 3-(3,5-di-t-butyl-4-hydroxybenzene)-propanoic acid 2-[3-(3,5-di-t-butyl-4-hydroxyphenyl)-1-oxypropyl]-hydrazide |
| Irganox ® 1098 | N,N'—hexamethylene bis(3,5-di-t-butyl-4-hydroxyhydrocinnamamide) |
| Ethanox ® 330 | 1,3,5-trimethyl-2,4,6-tris(3,5-di-t-butyl-4-hydroxybenzyl)benzene |
| Ethanox ® 796 | tris(3,5-di-t-butyl-4-hydroxyphenyl) phosphate |
| Santowhite ® Powder | 1,1-bis(2-methyl-4-hydroxy-5-t-butylphenyl)butane |

*Cyanox ® additive is manufactured by American Cyanamid Co., Bound Brook, New Jersey; Wingstay ® L additive is manufactured by Goodyear Chemicals Co., Akron, Ohio; Irganox ® additives are manufactured by Ciba-Geigy Corp., Ardsley, New York; Ethanox ® additives are manufactured by Ethyl Corp., Baton Rouge, Louisiana; and Santowhite ® powder is manufactured by Monsanto Co., St Louis, Missouri.

TABLE III

| Other Additives Used in Examples | |
|---|---|
| Designation | Description |
| TiO$_2$ | rutile titanium dioxide pigment |
| UMB | ultramarine blue pigment sold by Ricketts, Ltd., North Humberside, England |
| DIPAM/DM | copolymer of diisopropylaminoethyl methacrylate and n-decyl methacrylate in a 70:30 weight ratio employed as a dye enhancer for the spandex fiber* |
| PCAP | polycaprolactone glycol of about 2000 molecular weight, a stabilizer for some polyether-based spandex fibers, disclosed in a commonly assigned U.S. Pat. application by C. C. Ketterer, filed on the same date as the present application, available as "NIAX" polyol PCP-0240 from Union Carbide Chemicals |

TABLE III-continued

| Designation | Description |
|---|---|
| | Plastics Corp., New York, NY. |
| PC-DVB | copolymer of p-cresol and divinylbenzene, as disclosed in U.S. Pat. No. 3,553,290, a stabilizer employed in some polyester-based spandex fibers. |

*In the past, DIPAM/DM has been used as a co-stabilizer for spandex fibers. However, its stabilizing effect is not significant when used with the additives of the present invention. Nonetheless DIPAM/DM often is used with the present invention because of its dye-enhancing characteristics.

EXAMPLE I

This example illustrates a preferred embodiment of the invention. The discoloration resistance of a spandex yarn made from a polyether-based linear segmented polyurethane is greatly increased by the presence in the yarn of a hindered phenol and a phosphite additive in accordance with the invention.

A solution of segmented polyurethane in N,N-dimethylacetamide was prepared in accordance with the general procedure described in U.S. Pat. No. 3,428,711 (e.g., first sentence of Example II and the description of Example I). An intimate mixture was prepared of p,p'-methylenediphenyl diisocyanate and polytetramethylene ether glycol (of about 1800 molecular weight) in a molar ratio of 1.70 and was held at 80° to 90° C. for 90 to 100 minutes to yield an isocyanate-terminated polyether (i.e., a capped glycol), which was then cooled to 60° C. and mixed with N,N-dimethylacetamide to provide a mixture containing about 45% solids. Then, while maintaining vigorous mixing, the capped glycol was reacted for 2 to 3 minutes at a temperature of about 75° C. with N,N-dimethylacetamide solutions of diethylamine and of an 80/20 molar ratio of ethylenediamine and 1,3-cyclohexylenediamine chain extenders. The molar ratio of diamine chain extender to diethylamine was 6.31 and the molar ratio of diamine chain extenders to unreacted isocyanate in the capped glycol was 0.948. The resultant solution of segmented polyurethane contained approximately 36% solids and had a viscosity of about 2100 poises at 40° C. This polymer had an intrinsic viscosity of 0.95, measured at 25° C. in N,N-dimethylacetamide at a concentration of 0.5 gram per 100 ml of solution.

To the resultant viscous polymer solution were added Weston ® DHOP (phosphite additive), Wingstay ® L (phenolic additive), rutile $TiO_2$, DIPAM/DM, PCAP and UMB which respectively amounted to 2.0, 1.0, 5.0, 2.0, 1.0 and 0.01 percent based on the weight of the final spandex fiber (without finish).

The above-described mixture was then dry spun through orifices in a conventional manner to form 4-filament, 40-denier (44-dtex) yarns. A surface-lubricating finish of 91% polydimethylsiloxane, 5% polyamylsiloxane and 4% magnesium stearate was applied to the yarn. The yarn was then wound on a plastic-coated cardboard tube.

A yarn prepared in a manner similar to that described in the preceding paragraphs was knit into a nylon/spandex tricot fabric. The spandex yarn amounted to 20% by weight of the fabric. Samples of the fabric were finished with and without heat setting and with the application of an optical brightener. A control tricot fabric knit from nylon yarns only was prepared in a like manner. Discoloration as a result of heat setting was less for the spandex-containing fabric than for the all-nylon control (i.e., b of 4.1 versus 4.8). Samples of the controls and of fabrics made with the spandex yarns containing the additives in accordance with the present invention were then exposed to atmospheric smog in Los Angeles, California for 12 weeks. The test fabrics discolored less than the corresponding all-nylon samples (i.e., b of 3.3 vs 4.2 for the samples finished without heat setting and 1.3 vs 2.1 for the samples finished with heat setting). These results were considered excellent for the fabric construction tested and clearly showed a surprisingly large advantage in discoloration resistance for the fabrics that were knit with spandex yarns containing phosphite and phenolic additives in accordance with the present invention.

EXAMPLE II

Four 10-filament, 140-denier (160-dtex) spandex yarns were prepared in accordance with the procedures of Example I. Yarn A contained the same additives as the spandex yarns of Example I. Three comparison yarns were also made in the same way as Yarn A, except that the Wingstay ® L phenolic additives was omitted from comparison Yarn 1, the Weston ® DHOP phosphite additive was omitted from comparison Yarn 2 and all the additives except for the $TiO_2$ and UMB were omitted from comparison Yarn 3. The four yarns were treated for discoloration due to exposure to smog (SCAT test) and due to heat (200° C. thermal test). The following $\Delta b$ values resulted:

TABLE IV (EXAMPLE II)

| | Yarn A | Comparison Yarns | | |
|---|---|---|---|---|
| | | 1 | 2 | 3 |
| Additives % | | | | |
| Weston ® DHOP | 2 | 2 | 0 | 0 |
| Wingstay ® L | 1 | 0 | 1 | 0 |
| PCAP | 1 | 1 | 1 | 0 |
| DIPAM/DM | 2 | 2 | 2 | 0 |
| $\Delta b$ values | | | | |
| SCAT | 2.7 | 6.2 | 9.5 | 30.6 |
| 200° C. | 1.3 | 0.9 | 6.2 | 15.8 |

These results show the ability of the combination of a phenolic antioxidant and a phosphitic additive in accordance with the present invention to protect a spandex yarn from discoloration. In contrast to the excellent performance of Yarn A of the invention, the comparison yarns from which either the phenolic or the phosphitic additive, or both, had been omitted, exhibited highly undesirable discoloration.

EXAMPLE III

This example shows the unexpectedly large advantage that a yarn of the invention has over comparison yarns which are identical except that the comparison yarns contain a phosphorus-containing additive that does not meet the requirements of the present invention.

Yarn B of the invention was made in the same way as Yarn A of Example II, except that Cyanox ® 1790 amounting to 1.5% by weight of the finish-free yarn was substituted for the Wingstay ® L. Additional such yarns were made wherein the Weston ® DHOP was replaced by other phosphorus-containing additives. These additional yarns, which formed comparison Yarns 4 through 10, included commonly used phosphite additives, such as tris(nonylphenyl) phosphite, as well as some higher-priced, specialty phosphites which had been advertised as having good hydrolytic stability. The results of SCAT and 200° C.-thermal tests, which were carried out in two batches, are summarized in the following table.

TABLE V
(EXAMPLE III)

| Sample | Phosphite Additive | Δb values SCAT | Δb values 200° C. |
|---|---|---|---|
| First Batch | | | |
| Yarn B | Weston ® DHOP | 4.4 | 1.6 |
| Comparison 4 | Weston ® 618 | 6.4 | 5.0 |
| Comparison 5 | Ultranox ® 626 | 10.1 | 3.4 |
| Comparison 6 | Weston ® TNPP | 10.3 | 2.6 |
| Control | No phosphite | 9.6 | 3.2 |
| Second Batch | | | |
| Yarn B | Weston ® DHOP | 1.7 | 3.7 |
| Comparison 7 | TBP | 3.9 | 8.4 |
| Comparison 8 | Weston ® THOP | 3.9 | 6.4 |
| Comparison 9 | Sandostab ® P-EPQ* | 5.2 | 5.6 |
| Comparison 10 | Mark ® 2112 | 6.8 | 5.2 |
| Control | No phosphite | 6.3 | 5.5 |

*A phosphonite, not a phosphite (see Table I).

Table V shows the superiority of Yarn B, which contained a phosphite that met all the requirements of the present invention over comparison Yarns 4-10 which contained phosphorus-containing additives which were not dialkyl phenyl phosphites in accordance with the invention.

EXAMPLE IV

Spandex fibers containing phosphitic additives in accordance with the present invention are compared in this Example to spandex fibers having a phosphitic additive which does not meet the structural requirements of the present invention for such additives.

A series of spandex yarns, similar to Yarn B of Example III were prepared, except that the Cyanox ® 1790 concentration was 1%, the DIPAM/DM was omitted and the particular phosphite additive was changed. Table VI below illustrates the performance of six of these yarns in SCAT and 200° C. thermal tests. Yarns C through G are of the invention, but Comparison 11 contains a phosphite outside the scope of the present invention.

TABLE VI
(EXAMPLE IV)

| Sample | Phosphite Additive | Δb values SCAT | Δb values 200° C. |
|---|---|---|---|
| Yarn C | Weston ® DHOP | 2.1 | 1.2 |
| Yarn D | tetra-2-octyl (4,4'-isopropylidene-diphenol) diphosphite | 2.2 | 2.8 |
| Yarn E | diphenyl di-2-octyl (1,12-dodecanediol) diphosphite | 1.8 | 1.3 |
| Yarn F | phenyl 2-octyl 1-octadecyl phosphite | 2.7 | 3.3 |
| Yarn G | phenyl di-2-decyl phosphite | 2.1 | 2.7 |
| Comparison 11 | Weston ® PDDP | 1.4 | 12.4 |
| Control | No phosphite | 9.3 | —* |

*Not measured: > ~15

In Table VI, the phosphite additives of Yarns C through G meet the structural criteria for the dialkyl phenyl phosphite additive according to the invention. Note the poor performance of Weston ® PDDP of Comparison Yarn 11, which is very similar to the phosphite of Yarn G, but has the branches of its alkyl groups at the far ends of the alkyl chains rather than alpha to the phosphite moiety.

Poorer performance in comparison to phosphites in accordance with the present invention was obtained in similar tests of Weston ® 494, Weston ® DPDP, Weston ® PTP, TLP, NP-THOP and TPP.

Performance substantially equivalent to Yarn C which contained Weston ® DHOP was obtained with yarns containing Mark ® 5064 and a laboratory-prepared sample of the same material, as well as with yarns containing NP-DHOP and DPDD(HBA)DP.

The phosphites employed in this example were purchased from commercial sources (see Table I, page 11), or were prepared in accordance with procedures described in U.S. Pat. No. 3,419,524 by sodium-catalyzed exchange of alcohols with triphenyl phosphite, which in some cases also contained tris(nonylphenyl) phosphite.

EXAMPLE V

This example illustrates that a typical phosphite in accordance with the present invention can be used advantageously with a wide range of phenolic additives.

A series of yarns were prepared in accordance with the procedures for preparing Yarn B of Example III, except that 1.5% concentration of Cyanox ® 1790 was replaced by a 0.5% concentration of a phenolic additives listed in Table VII. The yarns were tested for discoloration due to smog (SCAT test) and heat (150° C. thermal test). A control yarn, was included which differed from the other yarns in that it contained 1.5% of Cyanox ® 1790 but contained no Weston ® DHOP and no PCAP. The results of the tests are summarized in the following table.

TABLE VII
(EXAMPLE V)

| Sample | Phenolic Additive | Δb values SCAT | Δb values 150° C. |
|---|---|---|---|
| Yarn H | Cyanox ® 1790 | 3.5 | 4.9 |
| Yarn I | Irganox ® 565 | 5.9 | 6.0 |
| Yarn J | Irganox ® 1010 | 3.2 | 5.4 |
| Yarn K | Irganox ® 1024 | 6.4 | 4.9 |
| Yarn L | Irganox ® 1098 | 6.8 | 4.3 |
| Yarn M | Ethanox ® 330 | 5.6 | 4.5 |
| Yarn N | Ethanox ® 796 | 4.8 | 7.2 |
| Yarn O | Wingstay ® L | 4.4 | 4.7 |
| Yarn P | Santowhite ® powder | 6.3 | 7.1 |
| Control | Cyanox ® 1790 | 19.4 | 6.7 |

Excellent results, similar to those obtained for Yarns H and O, were obtained when yarns containing Irganox ® 245 as the phenolic additive were similarly tested.

EXAMPLE VI

This example illustrates the increased resistance to heat- and smog-induced discoloration that can be imparted to a spandex yarn made from a polyester-based linear segmented polyurethane by incorporating in the yarn a combination of a phenolic antioxidant with a phosphite additive in accordance with the present invention.

A hydroxy-terminated polyester of about 3400 molecular weight was formed by reaction of 17.3 parts of ethylene glycol and 14.9 parts of butanediol with 67.8 parts of adipic acid. An isocyanate-terminated polyester was then formed by reacting at 80° C., 100 parts of the hydroxy-terminated polyester with 13.0 parts of p,p'- methylenediphenyl diisocyanate. The isocyanate-terminated polyester was then dissolved in 163.2 parts of N,N-dimethylacetamide and reacted with 1.30 parts ethylenediamine and 0.19 parts of diethylamine dissolved in an additional 54.6 parts of N,N-dimethylacetamide. The resultant polymer solution was blended with 5% $TiO_2$ and 0.01% UMB along with other additives, as described in the next paragraph. The thusly prepared polymer solutions were dry spun in a conventional manner through orifices to form coalesced 10-filament, 140-denier (160-dtex) yarns.

Three yarns were prepared. One yarn, Comparison 12, contained 0.5% PC-DVB (See Table III, for definition) as the other additive. Yarns S and T, respectively, contained 1.5% DHOP and 1.5% NP-DHOP, in addition to the 0.5% PC-DVB. Table VIII below summarizes the performance of these yarns in SCAT and thermal (200° C.) tests and shows that preferred phosphites in accordance with the present invention in combination with PC-DVB phenolic additive significantly improve the resistance of polyester-based spandex fibers to heat- and smog-induced discoloration.

TABLE VIII
(EXAMPLE VI)

| Sample | Δb values SCAT | 200° C. |
|---|---|---|
| Yarn S | 1.3 | 0.7 |
| Yarn T | 1.7 | 1.2 |
| comparison 12 | 3.8 | 2.9 |

What is claimed is:

1. In a spandex fiber containing a phenolic antioxidant and a phosphite, the improvement comprising for increased resistance to smog- or heat-induced discoloration, an effective amount of a dialkyl phenyl phosphite in which at least half of the alkyl groups are branched at the alpha position and the phenyl groups are unsubstituted or monoalkyl substituted.

2. A fiber of claim 1 wherein the spandex fiber is formed from a polyether-based spandex polymer.

3. A fiber of claim 1 wherein the weight ratio of phenolic antioxidant to phosphite is in the range of about 0.4:1 to 0.6:1.

4. A fiber of claim 1, 2 or 3 wherein the phosphite concentration is at least 0.5% and no more than 10% by weight of the fiber.

5. A fiber of claim 1, 2 or 3 wherein the phosphite concentration is in the range of from 1 to 3%.

6. A fiber of claim 1 wherein the phosphite is monomeric in form and has two alkyl groups and one phenyl group per phosphorus moiety.

7. A fiber of claim 6 wherein the phosphite is phenyl di-2-decyl phosphite.

8. A fiber of claim 1 wherein the phosphite is polymeric in form and the number of alkyl groups per phosphorus moiety averages in the range of 1.7:1 to 2.2:1 and the phenyl groups per phosphite moiety average in the range of 1.3:1 to 0.8:1.

9. A fiber of claim 8 wherein the number of phosphorus atoms in the polymeric dialkyl phenyl phosphite averages no more than eight per molecule.

10. A fiber of claim 8 wherein the polymeric phosphite has a molecular weight of at least 350.

11. A fiber of claim 8 wherein the phosphite is decaphenyl heptakis(dipropylene glycol) octaphosphite.

12. A fiber of claim 1 wherein the phenolic antioxidant is 2,4,6-tris(2,6-dimethyl-4-t-butyl-3-hydroxybenzyl)isocyanurate.

13. A fiber of claim 1 wherein the phenolic antioxidant is a condensation product of p-cresol, dicyclopentadiene and isobutene.

* * * * *